United States Patent
Shi

(10) Patent No.: US 8,625,048 B2
(45) Date of Patent: Jan. 7, 2014

(54) PLASTIC FRAME, LIQUID CRYSTAL MODULE AND LIQUID CRYSTAL DISPLAY

(75) Inventor: Qinjun Shi, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 118 days.

(21) Appl. No.: 13/380,076

(22) PCT Filed: Jul. 7, 2011

(86) PCT No.: PCT/CN2011/076966
§ 371 (c)(1),
(2), (4) Date: Dec. 22, 2011

(87) PCT Pub. No.: WO2012/171236
PCT Pub. Date: Dec. 20, 2012

(65) Prior Publication Data
US 2012/0320303 A1    Dec. 20, 2012

(30) Foreign Application Priority Data

Jun. 17, 2011    (CN) ...................... 2011 2 0206275 U

(51) Int. Cl.
*G02F 1/1333*    (2006.01)
(52) U.S. Cl.
USPC ............................................. 349/60; 349/58
(58) Field of Classification Search
USPC ....................................... 349/60, 58
See application file for complete search history.

(56) References Cited

U.S. PATENT DOCUMENTS

2007/0115401 A1*    5/2007    Tsubokura et al. ............. 349/58

FOREIGN PATENT DOCUMENTS

| CN | 1725075 A | 1/2006 |
|---|---|---|
| CN | 101206338 A | 6/2008 |

OTHER PUBLICATIONS

International Search Report of the PCT Application No. PCT/CN2011/076966.

* cited by examiner

*Primary Examiner* — Wen-Ying P Chen

(57) ABSTRACT

The disclosure provides a plastic frame, a liquid crystal module and a liquid crystal display. The plastic frame is provided with a plurality of blocking walls for locating liquid crystal glass, wherein said plastic frame and said blocking walls are arranged in split type. Said blocking walls are detachably connected with said plastic frame, comprising block locating sections with the front ends contacted with liquid crystal glass. Said plastic frame is provided with a plurality of clamping grooves whose positions are different and used for adjusting the positions of the locating sections. Said blocking walls are detachably connected with said clamping grooves. The disclosure further provides a liquid crystal module and a liquid crystal display, on which said plastic frames are arranged. The plastic frame, the liquid crystal module or the liquid crystal display provided by the disclosure can reduce the cost for producing the liquid crystal display effectively.

13 Claims, 4 Drawing Sheets

PLASTIC FRAME, LIQUID CRYSTAL MODULE AND LIQUID CRYSTAL DISPLAY

BACKGROUND

1. Technical Field

The disclosure relates to a plastic frame, in particular to a plastic frame used in the liquid crystal module of liquid crystal display.

2. Description of Related Art

As is known, existing liquid crystal display comprises liquid crystal glass. Liquid crystal glass is placed on a plastic frame, and each edge of the plastic frame is provided with blocking walls for locating liquid crystal glass. At present, the plastic frame and the blocking walls are integrally molded of plastic by mould. If there is slight discrepancy for the length and the width of liquid crystal glass of the liquid crystal module, then the plastic frame cannot be matched with the liquid crystal glass. It needs to develop a new mould for molding the plastic frame to match with liquid crystal glass. However, the cost of the mould for the plastic frame will affect the final cost of the liquid crystal module, which is not beneficial for reducing the production cost.

SUMMARY

The main purpose of the disclosure is to provide a plastic frame as well as a liquid crystal module with such plastic frame and a liquid crystal display with such liquid crystal module, which aims at reducing the production cost for the liquid crystal module of the liquid crystal display.

In order to realize above mentioned purposes, the disclosure provides a plastic frame which includes a plurality of blocking walls for locating the liquid crystal glass. Said blocking walls and said plastic frame are provided respectively, and said blocking wall includes a block locating section with a front end contacting with the liquid crystal glass; said plastic frame is provided with a plurality of clamping grooves whose positions are different and used for adjusting the positions of the locating sections. Said blocking walls are detachably connected with said clamping grooves.

Preferably, said blocking wall further includes a fixing section which is extended along the back end of the locating section and formed an external field angle with a side of the locating section; said plastic frame is provided with a receiving frame, which is protruded on the surface of the plastic frame and includes an opening with a width thereof equal to that of the locating section; said clamping grooves are arranged on the inner side wall of the receiving frame by layers, the shape and the size of each layer are same.

Preferably, said fixing sections are arranged in a triangle shape, an arc shape or a square shape.

Preferably, said blocking walls are T-shaped; the vertical section of the T shape is the locating section, and the horizontal section is the fixing section.

Preferably, said blocking walls include fixing sections with same shapes and same sizes.

Preferably, said clamping grooves are extended towards the opposite side of the liquid crystal glass on the plastic frame and are arranged at intervals; said clamping groove includes a buckling table; said blocking walls are provided with buckling bodies matched with said buckling tables; said buckling bodies are fitted with said buckling tables, which connect the blocking walls with the plastic frame.

Preferably, said blocking walls are square cavities, said clamping grooves are arranged on inner side walls of the cavities of the blocking walls; and said plastic frame is provided with projections that are matched with said clamping grooves.

Preferably, a thread adjustable structure is arranged between said locating section and said fixing section for adjusting the relative positions of them.

Preferably, said clamping grooves are linearly arrayed with multiple rows. Preferably, the inner side wall of the cavity of said blocking wall is provided with a plurality of linearly-arrayed clamping grooves.

The disclosure further provides a liquid crystal module, comprising a liquid crystal glass and a plastic frame. Said plastic frame is provided with blocking walls for locating liquid crystal glass. Said blocking walls and said plastic frame are provided respectively, and said blocking walls include a block locating section with a front end contacting with liquid crystal glass. Said plastic frame is provided with clamping grooves whose positions are different and used for adjusting the positions of the locating sections; and said blocking walls are detachably connected with said clamping grooves.

The disclosure further provides a liquid crystal display, including a liquid crystal module. Said liquid crystal module includes a liquid crystal glass and a plastic frame. Said plastic frame is provided with a plurality of blocking walls for locating the liquid crystal glass, wherein said blocking walls and said plastic frame are provided respectively, and said blocking wall includes a block locating section with a front end contacting with the liquid crystal glass; said plastic frame is provided with clamping grooves whose positions are different and used for adjusting the positions of the locating sections; and said blocking walls are detachably connected with said clamping grooves.

In the liquid crystal module of the liquid crystal display, the disclosure adjusts the relative positions of the blocking walls on the plastic frame by detachably connecting the blocking walls that are used for locating liquid crystal glass with the plastic frame; as a result, there is no need to develop new moulds to molding plastic frames for fitting with liquid crystal glass of different sizes, so that the production cost for the liquid crystal module of the liquid crystal display is reduced.

The purpose implementation, the function features and advantages of the disclosure will be further illustrated by integrating the exemplary embodiments and taking the attached drawings as references.

DETAILED DESCRIPTION OF THE EMBODIMENTS

It should be understood that the described exemplary embodiment is only used for illustrating this disclosure rather than limiting.

Figure 1:
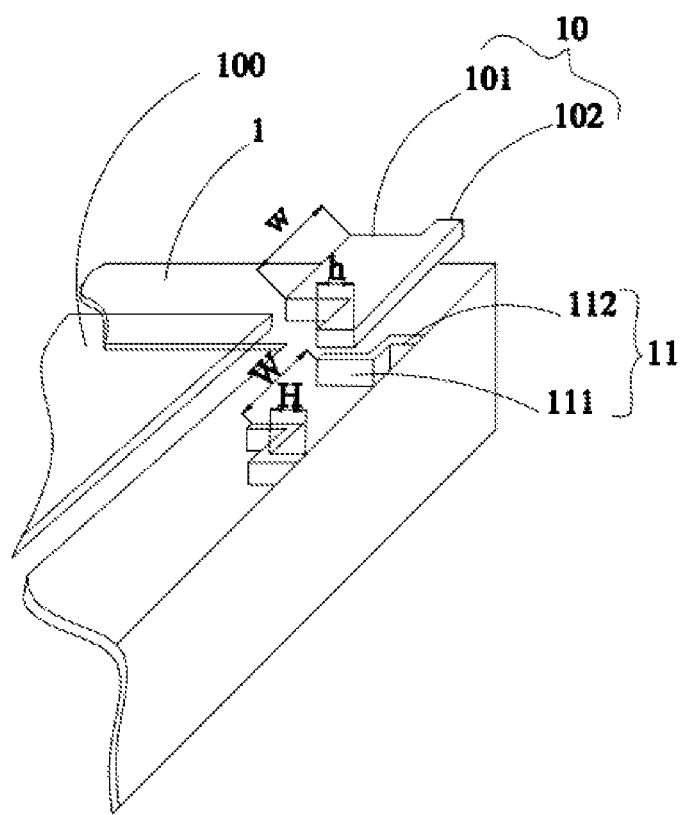
FIG. 1 is the schematic diagram showing the three-dimensional structure of a first exemplary embodiment of a plastic frame according to the disclosure.

Take FIG. 1 as a reference, which is the schematic diagram showing the three-dimensional structures of a plastic frame 1 and a blocking wall 10 in the first exemplary embodiment according to the disclosure.

In this exemplary embodiment, the plastic frame 1 is made of plastic and is in a shape of square frame. Each edge of the plastic frame is provided with a plurality of blocking walls 10 for locating a liquid crystal glass 100. Said blocking wall 10 comprises a block locating section 101, and a front end of the block locating section 101 contacts with the liquid crystal glass 100. A back end of the locating section 101 is provided with a fixing section 102, which is extended along the back end of the locating section 101 and is formed with an external field angle (the angle is 90 degrees in this exemplary) with the side of the locating section 101. More specifically, the blocking wall 10 in this exemplary embodiment is T-shaped; the vertical section of T-shaped is the locating section 101, which contacts with the liquid crystal glass 100. Multiple locating sections 101 are integrally enclosed into a receiving frame (not shown in FIGS) for locating the liquid crystal glass 100. The horizontal section of the T-shaped horizontal section is the fixing section 102, which is used for connecting with the plastic frame 1. In this exemplary embodiment, a length of the locating section 101 is adjustable; for example, the locating section 101 is arranged into series of different sizes or is arranged into a thread adjustable structure so as to match the liquid crystal glasses 100 of different sizes. The plastic frame 1 includes a receiving frame 11 for locating the blocking wall 10. Said receiving frame 11 is protruded on the surface of the plastic frame 1, including an opening end 111 and a clamping groove 112. The blocking wall 10 can be horizontally placed into said receiving frame 11, a front side of the locating section 101 is protruded on an end plane of the opening end 111 so as to locate the liquid crystal glass 100. An opening width W of the opening end 111 is approximate equal to a width w of the locating section 101 for locating the blocking wall 10 in left side and right side. A height H of the clamping groove 112 is approximate equal to a height h of the fixing section 102 for locating the blocking wall 10 in front side and back side. While connecting, nothing needs but to clamp each part relatively. The plastic material used by the blocking wall 10 in this exemplary is same as that of the plastic frame 1, which is integrally molded with the plastic frame 1 in one mould. In other embodiments, the blocking wall 10 can also use the plastic material with the hardness weaker than that of the plastic frame 1.

Since the blocking walls 10 are detachably connected with the plastic frame 1, so that the relative positions of the blocking walls 10 on the plastic frame 1 can be adjusted and said receiving frame can be fitted with various sizes of the liquid crystal glass 100. For example, when meeting various sizes of the liquid crystal glass 100, it only needs to adjust the size of the locating section 101 and make it fitted with the liquid crystal glass 100, and then assemble the blocking walls 10 with the receiving frame 11; therefore, different sizes of the liquid crystals glass 100 can be located without developing new moulds. Compared with the integral molding method for the plastic frame 1 and the blocking walls 10 in existing technology, the disclosure can reduce the cost for developing moulds. It should be illustrated that the shape of the fixing section 102 in this exemplary embodiment can not only be a square, but also be a triangle or an arc (such as semicircle, etc.); correspondingly, the clamping groove 112 on the plastic frame 1 is fitted therewith.

Figure 2:
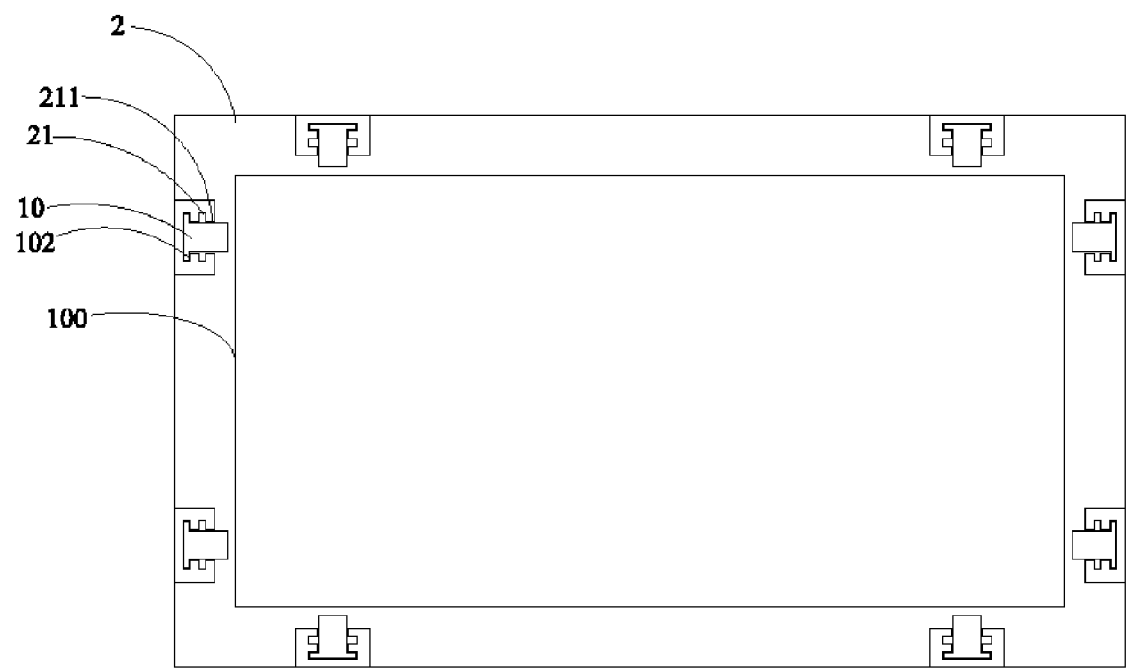
FIG. 2 is the schematic diagram showing the front-side structure of a second exemplary embodiment of the plastic frame according to the disclosure.

Take FIG. 2 as a reference, which is the schematic diagram showing the structure of the plastic frame 2 in a second exemplary embodiment according to the disclosure.

In this exemplary embodiment, the blocking walls can be the ones in the first exemplary embodiments. The plastic frame 2 is provided with clamping grooves 21 which are arranged in layers with each layer capable of clamping the fixing section 102; the clamping grooves 21 can either be concaved from the surface of the plastic frame 2 according to the shape shown in FIG. 2 or be provided with a frame body that is protruded on the surface of the plastic frame 2. The clamping grooves 21 are arranged on the inner side wall of the frame body. Front ends of the clamping grooves 21 are provided with openings 211. The clamping groove 21 of the previous layer and the clamping groove 21 of the next layer are same in shapes and sizes, a space and a the layer quantity between the two grooves are determined according to width of edges of the plastic frame 2 so that the size of the receiving frame can be finely adjusted. The layer quantity of the clamping grooves 21 in this exemplary embodiment is preferably selected as three.

Figure 3:
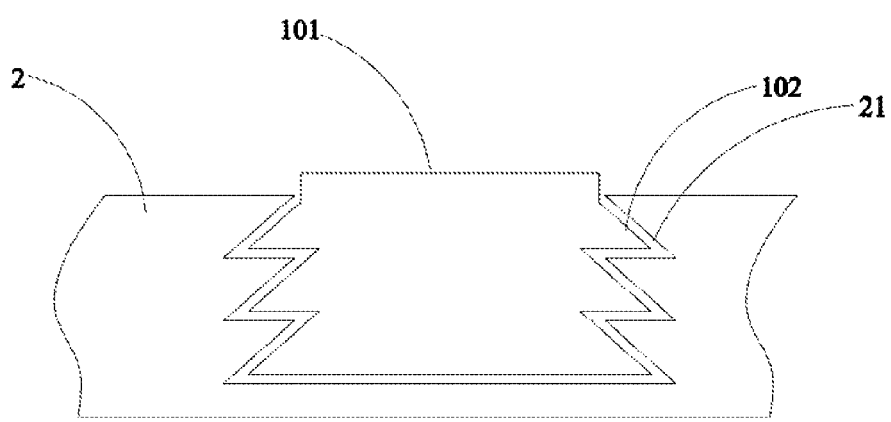
FIG. 3 is the schematic diagram showing the structure of a blocking wall of the second exemplary embodiment of the plastic frame according to the disclosure.

Take FIG. 3 as a reference, which is the schematic diagram showing the structure of the blocking wall of a second exemplary embodiment of the plastic frame according to the disclosure.

Further, the other preferable scheme of the blocking walls 10 lies as follows. The fixing section 102 is triangle-shaped (as shown in FIG. 3) and is also arranged in layers with equal shapes and sizes, as a result, it can be relatively connected with multiple layers of the clamping grooves 21 when connected with the clamping groove 11, so that the blocking walls 10 are more stably connected with the plastic frame 2. It should be illustrated that, in this exemplary embodiment, the shape of the fixing section 102 can not only be a triangle in this exemplary embodiment, but also be a square shown in FIG. 1 or the semicircle in other exemplary embodiments, so as to guarantee the blocking walls 10 can be located forward and backward.

Since the clamping grooves 21 are arranged in layers, thus the fixing section 102 of the blocking walls 10 can be selectively located on a clamping groove 21 of a certain layer according to the size of the liquid crystal glass 100 in the process of assembling. The locating position of the locating section 101 of the blocking walls 10 is changed so that the size of the receiving frame is adjusted, which can be fitted with different sizes of the liquid crystal glass 100.

Figure 4:
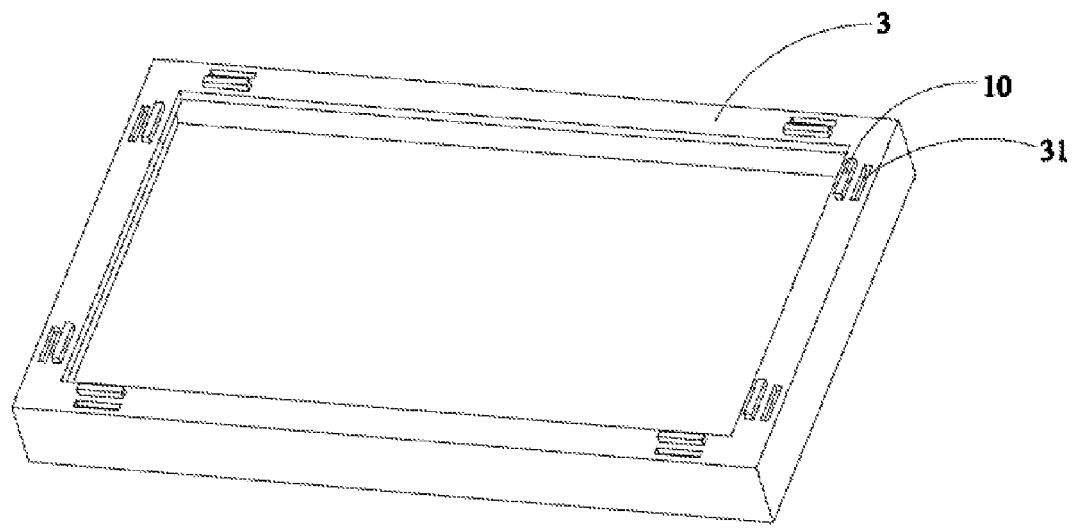
FIG. 4 is the schematic diagram showing the structure of a third exemplary embodiment of the plastic frame according to the disclosure.

Take FIG. 4 as a reference, which is the schematic diagram showing the structure of a plastic frame 3 of a third exemplary embodiment according to the disclosure. In this exemplary embodiment, each edge of the plastic frame 3 is provided with a clamping groove 31. The clamping groove 31 is extended towards the opposite side of the liquid crystal glass 100 on the plastic frame 3 and is arranged into multiple rows, each row is provided with a plurality of clamping grooves 31. Distances among the rows are designed according to the width of the edge of the plastic frame 3. If the edge is wider, the clamping grooves 31 can be arranged for more than two rows; it the edge is narrower, the clamping grooves 31 can be arranged for two rows, however, only the adjusting range is relatively smaller. In this exemplary embodiment, the clamping groove 31 is a buckling groove actually, the bottom of which is provided with a buckle table (not shown in FIGS).The blocking wall 10 is a strip-shaped plastic block or a plastic box and is only provided with a locating section 101 rather than a fixing section 102. A bottom part of the fixing section 101 is provided with a buckling body (not shown in FIGS) which is fitted with the clamping groove 31. Such buckle body is buckled with the clamping groove 31 and is used for connecting the blocking wall 10 with the plastic frame 3. When there is a need of adjusting the size of the receiving frame, it only needs to buckle the blocking wall 10 with the clamping groove 31 in an appropriate position; therefore it is convenient and energy-saving to adjust.

Figure 5:
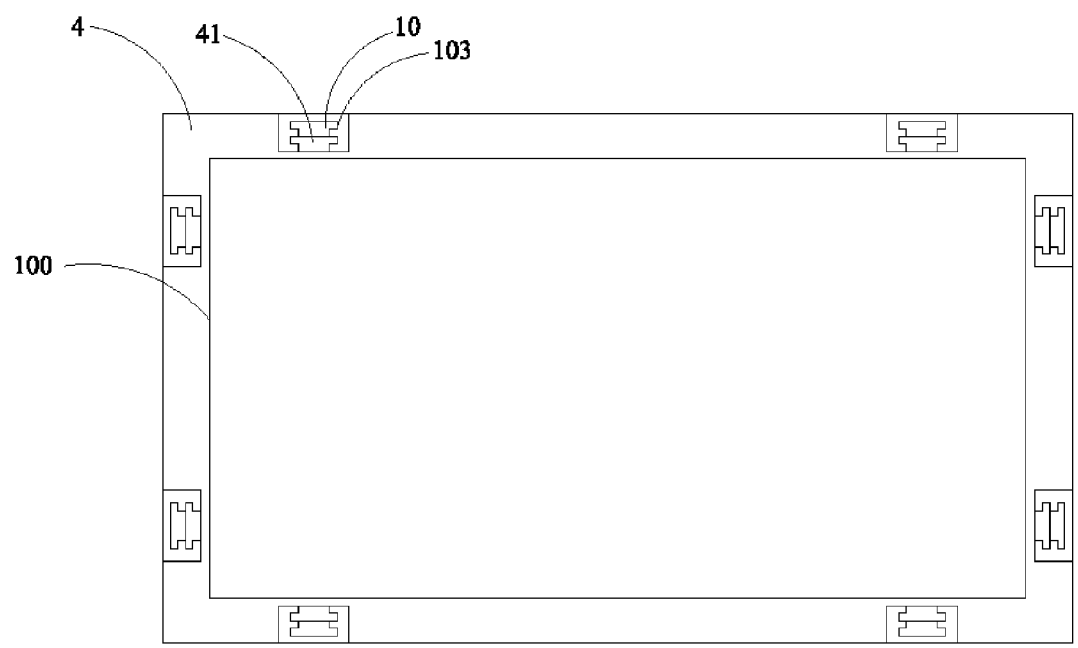
FIG. 5 is the schematic diagram showing the structure of a fourth exemplary embodiment of the plastic frame according to the disclosure.

Take FIG. 5 as a reference, which the schematic diagram showing the structure of a plastic frame 4 in a fourth exemplary embodiment according to the disclosure. The blocking wall 10 is hollow arranged, specifically, the blocking wall 10 is a square frame; side walls of the cavity of the square frame is provided with a plurality of clamping groves 103. Said clamping grooves 103 are arranged in layers according to the form of the clamping groove 21 in the second exemplary embodiment. The plastic frame 4 is provided with a projection 41 fitted with an inner cavity of the blocking wall 10 for locating the blocking wall 10. In this exemplary embodiment, the projection 41 can be one or multiples ones, and each projection 41 is equal in distance and shape, therefore a larger adjusting range can be obtained.

Since the clamping groove 103 is arranged, thus the blocking wall 10 can adjust and locate the size of the receiving cavity of the liquid crystal glass 100 by moving position of the blocking wall 10 on the plastic frame 4 at back, left and right, so as to fit with the liquid crystal glass 100 of different sizes. In this exemplary embodiment, the blocking wall 10 can also be molded the plastic frame 4 by one mould and of the same plastic material.

In addition, the projection 41 can be arranged on the blocking wall 10 and the clamping groove 103 can be arranged on the plastic frame 4, thereby the adjusting can be still realized.

Figure 6:
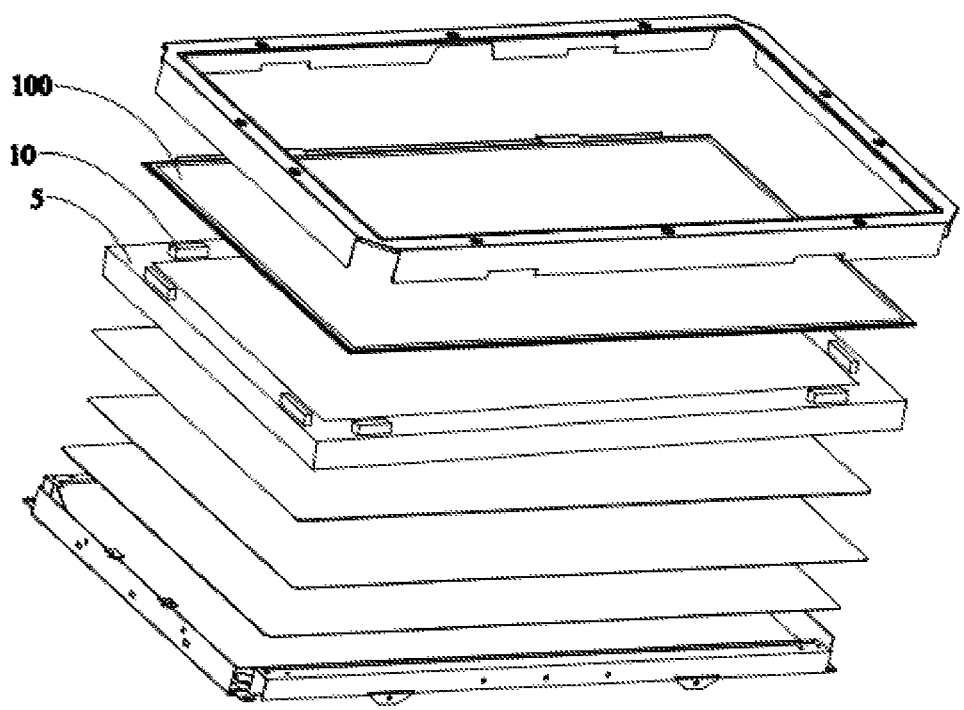
FIG. 6 is the schematic diagram showing the structure of a first exemplary embodiment of the liquid crystal module according to the disclosure.

The plastic frames 1, 2, 3 or 4 of the disclosure can be applied to the liquid crystal module. Liquid crystal module is an important constituent part of liquid crystal display. Taking FIG. 6 as reference, which is the schematic diagram showing the structure of a first exemplary embodiment of the liquid crystal module according to the disclosure. In this exemplary embodiment, the liquid crystal module includes a plastic frame 5; such plastic frame 5 can be said plastic frame 1, 2, 3 or 4. Since the plastic frame 5 of the liquid crystal module according to the disclosure provides with the structures of said plastic frame 1, 2, 3 or 4, so that the liquid crystal module of the disclosure can assembly liquid crystal glass of different sizes without remolding; as a result, the production cost for the liquid crystal module is reduced. Please take the first, the second, the third and the fourth exemplary embodiment of said plastic frame as references to further understand the structures of the plastic frame 1, 2, 3 and 4, so it will not illustrate more details here.

The disclosure further provides a liquid crystal display, which can be applied to LCD TV (Liquid Crystal Display Television). Except said liquid crystal modules, the liquid crystal display further includes a light source unit, a casing, etc. Since the plastic frame of the liquid crystal module provides with the structures of said plastic frame 1, 2, 3 or 4, so that the cost of the liquid crystal display is reduced to a large extent. The liquid crystal display and relative products are provided with stronger market competition advantages.

What is illustrated above is just a preferable exemplary embodiment, which will not limit the patent scope of the disclosure. Any equivalent replacements made by the specifications and drawings of the disclosure, which are directly or indirectly applied to other technical fields, should be included into the protection scope of the disclosure.

What is claimed is:

1. A plastic frame, comprising blocking walls for locating a liquid crystal glass, characterized in that, said blocking walls and said plastic frame are provided respectively; said blocking wall comprises a block locating section with a front end contacting with the liquid crystal glass; said plastic frame is provided with a plurality of clamping grooves for adjusting the positions of the locating sections; said blocking walls are detachably connected with said clamping grooves; blocking wall further comprises a fixing section which is extended along the back end of the locating section and formed an external field angle with a side of the locating section; said plastic frame is provided with a receiving frame, which is protruded on the surface of the plastic frame and comprises an opening with a width thereof equal to that of the locating section; said clamping grooves are arranged on inner side walls of the receiving frame by layers, the shape and the size of each layer are same.

2. The plastic frame according to claim 1, characterized in that, said fixing sections are arranged in a triangle shape, an arc shape or a square shape.

3. The plastic frame according to claim 2, characterized in that, a thread adjustable structure is arranged between said locating section and said fixing section for adjusting the relative positions of them.

4. The plastic frame according to claim 1, characterized in that, said blocking walls are T-shaped; the vertical section of the T shape is the locating section, and the horizontal section is the fixing section.

5. The plastic frame according to claim 4, characterized in that, said blocking walls comprise at least two layers of fixing sections of same shapes and same sizes.

6. The plastic frame according to claim 4, characterized in that, a thread adjustable structure is arranged between said locating sections and said fixing sections for adjusting the relative positions of them.

7. A liquid crystal module, characterized in that, the liquid crystal module comprises a plastic frame; said plastic frame is provided with blocking walls for locating a liquid crystal glass, wherein said blocking walls and said plastic frame are provided respectively, and said blocking wall comprises a block locating section with a front end contacting with the liquid crystal glass; said plastic frame is provided with clamping grooves for adjusting the positions of the locating sections; and said blocking walls are detachably connected with said clamping grooves; said blocking wall further comprises a fixing section which is extended along the back end of the locating section and formed an external field angle with a side of the locating section; said plastic frame is provided with a receiving frame, which is protruded on the surface of the plastic frame and comprises an opening with a width equal to that of the locating section; said clamping grooves are arranged on the inner side wall of the receiving frame by layers, a shape and a size of each layer are same.

8. The liquid crystal module according to claim 7, characterized in that, said fixing sections are in a triangle shape, an arc shape or a square shape.

9. The liquid crystal module according to claim 7, characterized in that, said blocking walls are T-shaped; the vertical section of the T shape is the locating section, and the horizontal section is the fixing section.

10. The liquid crystal module according to claim 7, characterized in that, said blocking walls comprise at least two layers of fixing sections with same shapes and same sizes.

11. A plastic frame, comprising blocking walls for locating a liquid crystal glass, characterized in that, said blocking walls and said plastic frame are provided respectively; said blocking wall comprises a block locating section with a front end contacting with the liquid crystal glass; said plastic frame is provided with a plurality of clamping grooves for adjusting the positions of the locating sections; said blocking walls are detachably connected with said clamping grooves; said clamping grooves are extended towards the opposite side of the liquid crystal glass on the plastic frame and are arranged at intervals; said clamping groove comprises a buckling table; said blocking walls are provided with buckling bodies matched with said buckling tables; said buckling bodies are fitted with said buckling tables, which connect the blocking walls with the plastic frame.

12. The plastic frame according to claim 11, characterized in that, said clamping grooves are linearly arrayed with multiple rows.

13. A plastic frame, comprising blocking walls for locating a liquid crystal glass, characterized in that, said blocking walls and said plastic frame are provided respectively; said blocking wall comprises a block locating section with a front end contacting with the liquid crystal glass; said plastic frame is provided with a plurality of clamping grooves for adjusting the positions of the locating sections; said blocking walls are detachably connected with said clamping grooves; said blocking walls are square cavities, said clamping grooves are arranged on inner side walls of the cavities of the blocking walls; and said plastic frame is provided with projections matched with said clamping grooves, and the inner side walls of the cavity of said blocking wall is provided with a plurality of linearly-arrayed clamping grooves.

* * * * *